(12) United States Patent
Verrecchia et al.

(10) Patent No.: US 10,871,239 B2
(45) Date of Patent: Dec. 22, 2020

(54) HIGH FLOW MINIATURE PROPORTIONAL CONTROL VALVE WITH LINEAR MOVING MAGNETIC VOICE COIL MOTOR

(71) Applicant: Parker-Hannifin Corporation, Cleveland, OH (US)

(72) Inventors: Joel J. Verrecchia, Hollis, NH (US); James A. Burns, Wilton, NH (US); Edwin L. Brown, Hudson, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 22 days.

(21) Appl. No.: 16/355,965

(22) Filed: Mar. 18, 2019

(65) Prior Publication Data

US 2019/0346057 A1 Nov. 14, 2019

Related U.S. Application Data

(60) Provisional application No. 62/669,697, filed on May 10, 2018.

(51) Int. Cl.
| | |
|---|---|
| *F16K 31/04* | (2006.01) |
| *H02K 41/035* | (2006.01) |
| *G05D 16/20* | (2006.01) |
| *H02K 33/02* | (2006.01) |
| *F16K 37/00* | (2006.01) |

(Continued)

(52) U.S. Cl.
CPC ............ *F16K 31/047* (2013.01); *F16K 31/06* (2013.01); *F16K 31/0682* (2013.01);
(Continued)

(58) Field of Classification Search
CPC .... F16K 31/08; F16K 31/082; F16K 31/0693; F16K 31/0679; F16K 31/047;
(Continued)

(56) References Cited

U.S. PATENT DOCUMENTS

| | | | | |
|---|---|---|---|---|
| 3,499,463 | A * | 3/1970 | Walters | ................. F16K 31/082 137/595 |
| 3,570,806 | A * | 3/1971 | Sturman | ............... F16K 31/082 251/65 |

(Continued)

FOREIGN PATENT DOCUMENTS

CN 101572472 11/2009

*Primary Examiner* — Matthew W Jellett
(74) *Attorney, Agent, or Firm* — Renner, Otto, Boisselle & Sklar, LLP

(57) ABSTRACT

A proportional valve includes an actuator, having a first magnet element and a second magnet element that are energized by wire coils; a non-magnetic carrier in which the first magnet element and the second magnet element are mounted; a first spring beam to which the non-magnetic carrier is suspended adjacent to the first magnet element, and a second spring beam to which the non-magnetic carrier is suspended adjacent to the second magnet element; and a flux frame that conducts magnetic field lines through the actuator. When the wire coils are energized, a magnetic field is created which causes the non-magnetic carrier to move against a valve operator to move a valve poppet away from the closed position against a valve seat, thereby opening the valve. The first and second spring beams restrain the movement of the non-magnetic carrier to an arc of sufficient radius that said movement is quasi-linear.

19 Claims, 2 Drawing Sheets

(51) Int. Cl.
  *H02K 33/18* (2006.01)
  *F16K 31/06* (2006.01)
  *F16K 31/08* (2006.01)

(52) U.S. Cl.
  CPC ........ *F16K 31/0693* (2013.01); *F16K 31/082*
    (2013.01); *F16K 37/0041* (2013.01); *G05D*
    *16/2006* (2013.01); *H02K 33/02* (2013.01);
    *H02K 33/18* (2013.01); *H02K 41/0354*
    (2013.01)

(58) Field of Classification Search
  CPC .... F16K 31/10; H02K 41/0354; H02K 33/02;
    H02K 33/18; H01F 7/1615; H01F 7/1646;
    G05D 16/2006; G05D 16/2022
  USPC ................. 251/65, 129.02, 129.18
  See application file for complete search history.

(56) References Cited

U.S. PATENT DOCUMENTS

| | | | | |
|---|---|---|---|---|
| 4,004,258 A | * | 1/1977 | Arnold | F16K 31/082 |
| | | | | 335/17 |
| 4,343,329 A | * | 8/1982 | Turansky | F16K 31/082 |
| | | | | 137/625.44 |
| 4,365,125 A | | 12/1982 | Keller | |
| 4,606,502 A | * | 8/1986 | Naschberger | B05B 12/00 |
| | | | | 239/583 |
| 5,170,144 A | * | 12/1992 | Nielsen | H01F 7/13 |
| | | | | 156/272.2 |
| 5,259,415 A | * | 11/1993 | Hess | F16K 31/082 |
| | | | | 137/625.44 |
| 5,388,614 A | * | 2/1995 | Hakamada | F16K 31/082 |
| | | | | 137/625.24 |
| 5,464,041 A | * | 11/1995 | Reinicke | F16K 31/082 |
| | | | | 137/315.03 |
| 5,547,165 A | | 8/1996 | Brehm et al. | |
| 6,199,587 B1 | * | 3/2001 | Shlomi | F16K 31/082 |
| | | | | 137/625.5 |
| 7,066,154 B2 | * | 6/2006 | Zdravkovic | F02M 25/0809 |
| | | | | 123/516 |
| 8,297,589 B2 | | 10/2012 | Dourdeville et al. | |
| 8,613,421 B2 | * | 12/2013 | Ams | F16K 31/0682 |
| | | | | 251/129.2 |
| 9,631,737 B2 | * | 4/2017 | Brust | F16K 27/003 |
| 9,856,993 B2 | * | 1/2018 | Fuchs | H01F 7/066 |
| 10,288,187 B2 | * | 5/2019 | Vogt | F16K 11/022 |

* cited by examiner

HIGH FLOW MINIATURE PROPORTIONAL CONTROL VALVE WITH LINEAR MOVING MAGNETIC VOICE COIL MOTOR

RELATED APPLICATIONS

This application claims the benefit of U.S. Provisional Application No. 62/669,697 filed May 10, 2018, the contents of which are incorporated herein by reference.

FIELD OF INVENTION

The present invention relates generally to valves, and more particularly to valves for use in high pressure and high flow applications, such as for example in life science and medical applications.

BACKGROUND OF THE INVENTION

High pressure and high flow valves are used in a variety of applications. For example, clinical laboratories and hospitals utilize various diagnostic apparatuses to analyze patient medical samples, such as blood, urine, other fluids, and tissues. Such applications further include portable medical devices that aid breathing, such as oxygen concentrators and ventilators. In such apparatuses, high pressure and high flow valves control the flow of gases or other fluids. Because it is desirable for such apparatuses to be as compact as practicable, the size of the valves remains a concern, but with reduced size sufficient flow rate and pressure capability needs to be maintained.

Today, high flow proportional valves are mostly actuated by solenoids. However, solenoids only provide strong actuation forces at small magnetic gaps. This means that the stroke of a miniature solenoid valve is limited. Traditional voice coil actuators can achieve large strokes, but they require very high power to achieve the forces needed in miniature high flow proportional valves. Voice coils also tend to be relatively heavy and large, which are not suitable for the more compact type devices referenced above. Electric motors have also been used to actuate proportional valves, but they tend to be large, heavy and too slow to respond.

Accordingly, valves with an electromagnetically driven actuator may be preferred in high pressure and high flow applications. Higher flow and pressure capabilities typically require a larger valve actuator to develop the sealing force needed for valve operation, which poses a significant challenge in balancing size and performance. To achieve higher flow, a larger orifice is required, and consequently a larger stroke to allow full flow to develop. However, this requires more magnetic attraction force from the actuator to overcome the large air gap.

Some improvement in the magnetic attraction force that drives the actuator can be made through magnetic material selection, but the performance difference between materials that are readily available and cost effective is limited. Additional improvements in attraction force can be made through increased coil power and number of wire turns, but there are diminishing returns once the soft magnetic materials have been saturated with the magnetic flux, and peak power budgets must also be considered. Increasing cross-sectional area of the flux path components allows more flux to be carried and thus increases the magnetic attraction force, but this must be balanced against the desire to reduce the valve size and weight for portability. Accordingly, it has proven difficult to reduce valve size while maintaining efficient low-power performance at the requisite high flows and pressures of valves.

SUMMARY OF THE INVENTION

Aspects of the present disclosure relate to a high flow miniature proportional valve with diaphragms to balance pressure on both inlet and outlet ports. The valve operator is hermetically sealed from the actuator and the outside environment. The actuator is a moving magnet, linear motor voice coil type actuator whereby the magnet elements are constrained by spring steel beams within a narrow flux frame gap. Two conductive coils are wound on the flux frame to generate a magnetic field at the narrow gap when current is applied to the coils. In the narrow gap constrained by the spring steel members are two rare earth magnets, held apart by a non-magnetic frame, with the poles of the magnets facing opposite directions. Therefore, when a magnetic field is generated in the narrow gap, one magnet is pulled in towards the flux frame while the other magnet is repelled from the flux frame. In this way the net actuation force is doubled. The actuator is attached to the valve operator such that a pre-load from the actuator is adjustable to compensate for manufacturing tolerances or for customer flow and power requirements.

Embodiments described herein are configured as a miniature high flow proportional valve with a unique linear moving magnet voice coil motor. The linear voice coil is paired with a dual diaphragm inlet and outlet pressure balance mechanism, and a hermetically sealed valve operator. The actuator and valve operator are joined with a variable calibration interface to ensure consistent performance from valve to valve.

The unique linear moving magnet motor has a minimally narrow magnetic gap which provides high actuation force across a relatively large stroke while minimizing the power required. This is accomplished by creating a flux frame with a narrow magnetic gap in which two narrow rare earth magnets are positioned inside a non-magnetic frame suspended by first and second spring steel beams adjacent to respective magnet elements. The magnet elements are positioned with their poles opposite each other such that when the coils are energized, one magnet is pulled toward the centerline of the flux frame while the other magnet is repelled from the centerline of the flux frame. The two spring steel beams restrain the motion of the non-magnetic frame that houses the magnet elements to an arc with a large enough radius such that the motion is quasi-linear. This makes the actuator silent since there are no contacting parts, which is desirable for users particularly of breathing apparatuses that are used in close proximity to patients.

The valve operator is constructed such that pressure forces on the inlet or outlet port of the valve are balanced by either the inlet or outlet diaphragm. By substantially balancing the pressure forces the valve can be actuated by a relatively small actuation force. The diaphragms, along with port gasket seals, make the valve operator hermetically sealed from the actuator and the outside environment. This diaphragm balance configuration does not use a small bleed hole to port pressure to the back side of the diaphragm as is commonly done in conventional configurations, which is undesirable because a small bleed hole can be easily plugged by particulates and viscous fluids.

An aspect of the invention, therefore, is a proportional valve having a narrow magnetic gap to improve actuator performance, and pressure balancing diaphragms that reduce the required actuation force. In exemplary embodiments, the proportional valve includes a valve assembly including a valve body that houses a valve operator. The valve body defines an inlet and an outlet for a fluid flow through the valve body. The valve operator has a longitudinal axis and includes a poppet that is moveable along the longitudinal axis between a closed position and an open position, wherein in the closed position the poppet seals against a valve seat of the valve body to prevent fluid flow between the inlet and the outlet, and in the open position the poppet is moved away from the valve seat to permit fluid flow between the inlet and the outlet. The proportional valve further includes an actuator, wherein the actuator comprises an actuator housing that houses: a first magnet element and a second magnet element; a non-magnetic carrier in which the first magnet element and the second magnet element are mounted; a first wire coil located adjacent to the magnet elements and a second wire coil located adjacent to the magnet elements on an opposite side of the magnet elements relative to the first wire coil; a first spring beam to which the non-magnetic carrier is suspended adjacent to the first magnet element, and a second spring beam to which the non-magnetic carrier is suspended adjacent to the second magnet element; and a flux frame that conducts magnetic field lines through the actuator. When the wire coils are energized, a magnetic field is created which causes the non-magnetic carrier to move against the valve operator to move the valve poppet away from the closed position against the valve seat, thereby opening the valve. The first and second spring beams restrain the movement of the non-magnetic carrier to an arc of sufficient radius that said movement is quasi-linear. The valve operator further includes an inlet diaphragm adjacent to the inlet and an outlet diaphragm adjacent to the outlet that balances pressure forces at the inlet and the outlet.

Another aspect of the invention is a method of calibrating a proportional valve comprising the steps of: providing an actuator and a valve assembly including a valve operator and valve body according to any of the embodiments; setting the actuator housing relative to the valve body to position the actuator housing relative to the valve body such that spring beams are preloaded to achieve desired flow and leak performance; and positioning components of the actuator within the actuator housing in a manner that maintains the preload at which the desired flow and leak performance are achieved. Setting the actuator housing may include pressing the actuator housing against the valve operator to position the actuator housing. With such operations, the first and second spring beams are pre-loaded to optimize positioning of the first and second magnet elements within the flux frame gap.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
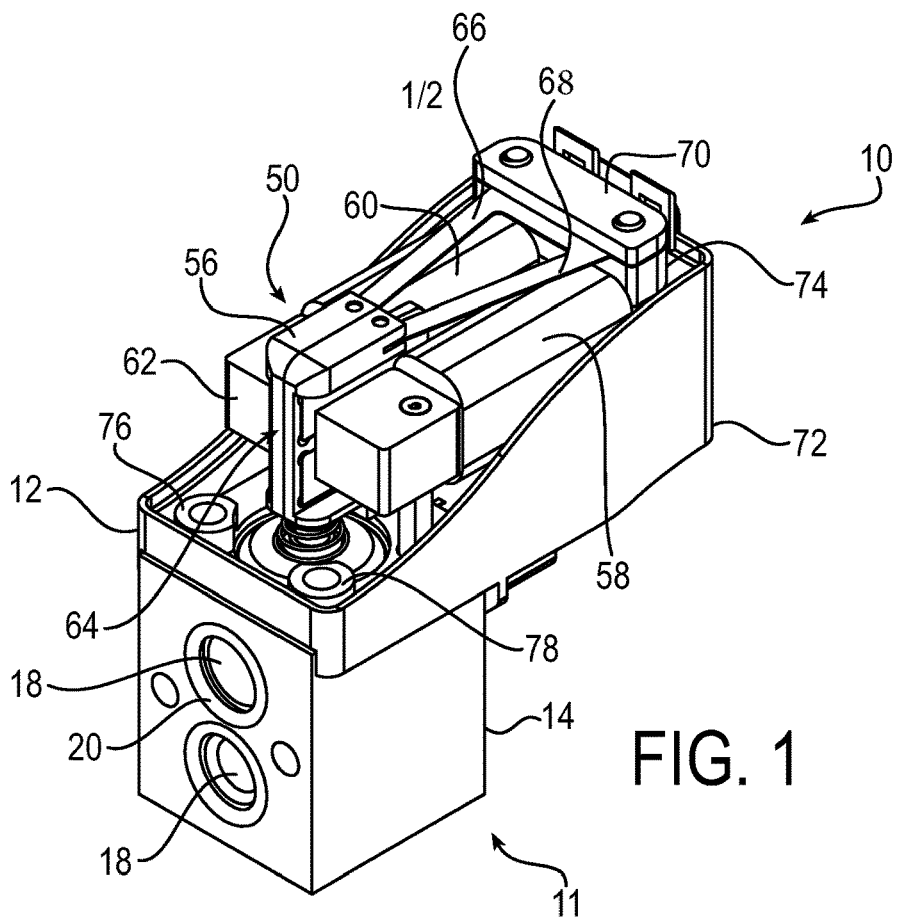
FIG. 1 is a drawing depicting an isometric view of an exemplary miniature proportional valve in accordance with embodiments of the present invention.

Embodiments of the present invention will now be described with reference to the drawings, wherein like reference numerals are used to refer to like elements throughout. It will be understood that the figures are not necessarily to scale.

Figure 2:
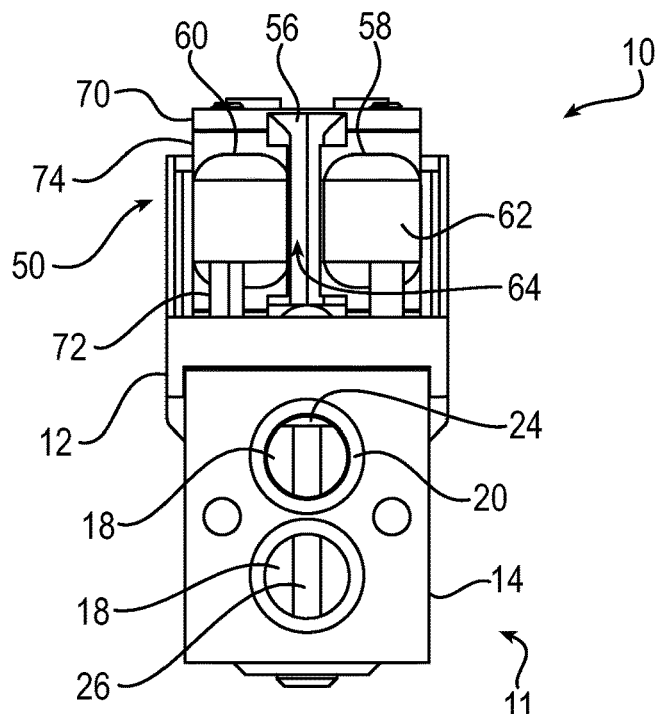
FIG. 2 is a drawing depicting a port-on view of the exemplary miniature proportional valve of FIG. 1.
Figure 3:
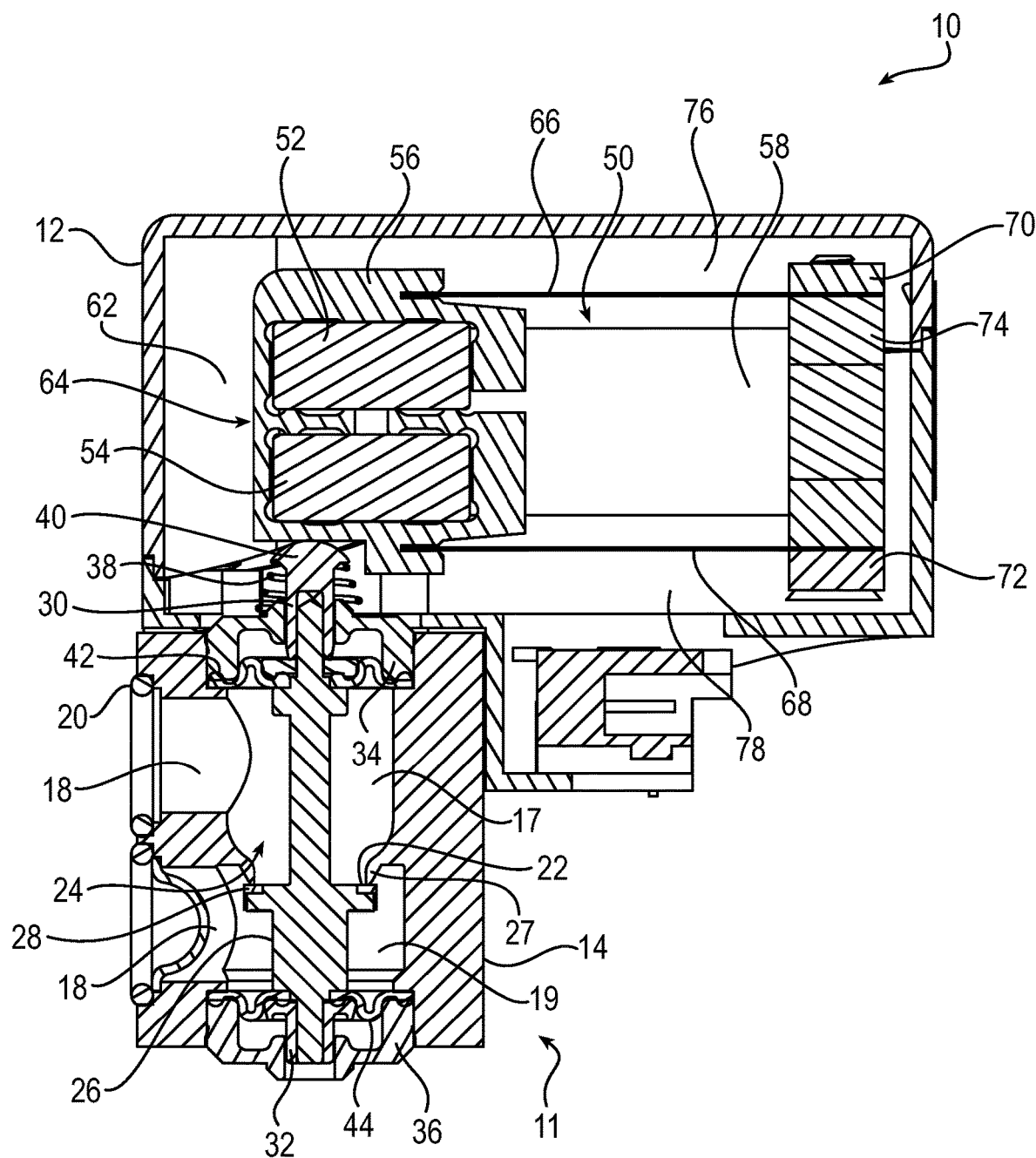
FIG. 3 is a drawing depicting a side cross sectional view of the exemplary miniature proportional valve of FIG. 1.

FIGS. 1-3 depict various views of an exemplary low profile miniature proportional valve 10. The proportional valve 10 generally has a more compact size and uses less materials (less weight) as compared to conventional configurations. The present invention can achieve a valve structure that is less than one third the size and less than one quarter the weight of conventional configurations, for a comparable application. In addition, the configuration of the present invention reduces the number and spatial extent of air gaps, resulting in an enhanced transmission of magnetic flux while maintaining such more compact size and weight as compared to conventional configurations.

An aspect of the invention, therefore, is a proportional valve having a narrow magnetic gap to improve actuator performance, and pressure balancing diaphragms that reduce the required actuation force. In exemplary embodiments, the proportional valve includes a valve assembly including a valve body that houses a valve operator. The valve body defines an inlet and an outlet for a fluid flow through the valve body. The valve operator has a longitudinal axis and includes a poppet that is moveable along the longitudinal axis between a closed position and an open position, wherein in the closed position the poppet seals against a valve seat of the valve body to prevent fluid flow between the inlet and the outlet, and in the open position the poppet is moved away from the valve seat to permit fluid flow between the inlet and the outlet. The proportional valve further includes an actuator, wherein the actuator comprises an actuator housing that houses: a first magnet element and a second magnet element; a non-magnetic carrier in which the first magnet element and the second magnet element are mounted; a first wire coil located adjacent to the magnet elements and a second wire coil located adjacent to the magnet elements on an opposite side of the magnet elements relative to the first wire coil; a first spring beam to which the non-magnetic carrier is suspended adjacent to the first magnet element, and a second spring beam to which the non-magnetic carrier is suspended adjacent to the second magnet element; and a flux frame that conducts magnetic field lines through the actuator. When the wire coils are energized, a magnetic field is created which causes the non-magnetic carrier to move against the valve operator to move the valve poppet away from the closed position against the valve seat, thereby opening the valve. The first and second spring beams restrain the movement of the non-magnetic carrier to an arc of sufficient radius that said movement is quasi-linear.

Referring to the figures, in the exemplary embodiment of FIGS. 1-3, the proportional valve 10 includes an actuator housing 12 that houses an actuator described below, and a valve assembly 11 that includes a valve body 14 and a valve operator that also is described below. The actuator housing 12 is mounted on the valve body 14. The valve body 14 is configured as a porting manifold that defines an inlet port 16 and an outlet port 18. The inlet and outlet ports may be sealed by a plurality of manifold seals 20 including an inlet seal that seals the inlet and an outlet seal that seals the outlet, which may be configured as O-ring seals. Fluid can flow between the inlet port 16 and outlet port 18 via an inlet fluid pathway 17 and an outlet fluid pathway 19, and through a central orifice 22 (see FIG. 3). Fluid control through the central orifice 22 is controlled by a valve operator 24. It will be appreciated that the terms inlet and outlet are utilized for convenient reference, and that the flow direction can be reversed to interchange the inlet port and outlet port and the associated fluid pathways.

Referring principally to the cross-sectional view of FIG. 3, the valve operator 24 has a longitudinal axis and includes a moveable poppet 26 that is moveable along the longitudinal axis between a closed position and an open position. When the valve poppet 26 is in the open position, the central orifice 22 is open and fluid can flow between the inlet port and the outlet port. When the valve poppet 26 is in the closed position, the poppet seals against a valve seat 27 of the valve body such that the central orifice 22 is closed and fluid flow between the inlet port and the outlet port is blocked. The poppet may include a sealing element or orifice seal 28, whereby in the closed position the central orifice 22 is sealed by the sealing element 28 that seals against the valve seat 27. The sealing element 28 also may be an O-ring seal or a suitable rubber element over-molded onto the poppet. The valve operator poppet 26 is hermetically sealed from the actuator and the outside environment or external surroundings.

At opposite ends, movement of the poppet 26 may be guided by a first poppet guide 30 located at a first end of the valve poppet, and a second poppet guide 32 located at an opposite second end of the valve poppet. The poppet guides guide movement of the valve poppet between the closed position and the open position. Movement of the poppet 26 further is guided by movement relative to a first bearing 34 positioned adjacent the first poppet guide 30, and a second bearing 36 positioned adjacent the second poppet guide 32. The first poppet guide 30 of the valve operator may include a valve spring 38 that aids in the control of the poppet movement, and the valve spring 38 biases the poppet 26 in the closed position. The first poppet guide 30 may be configured to have a rounded head 40, against which the actuator interacts to move the poppet away from the closed position as further detailed below.

Also as further detailed below, the actuator is configured as a linear voice coil motor. Such linear voice coil motor is paired with a dual diaphragm inlet and outlet pressure balance mechanism that provides for pressure balance of the hermetically sealed valve poppet. The actuator and valve operator are joined with a variable calibration interface to ensure consistent performance, and a calibration procedure is described below.

The valve operator 24 configured with the hermetically sealed poppet 26 is constructed such that fluid pressure forces on the inlet or outlet port are balanced by a dual diagraph pressure balance mechanism. In particular, the valve structure includes an inlet diaphragm 42 adjacent to the inlet port 16 at the inlet pathway 17, and an outlet diaphragm 44 adjacent to the outlet port 18 at the outlet pathway 19. The inlet and/or outlet diaphragms pressure balance flow pressures at the inlet and outlet ports to provide an enhanced flow control suitable for the high flow rates required by the applications referenced in the background section. By substantially balancing the pressure forces, the proportional valve 10 can be actuated by a relatively small actuation force. The diaphragms may include gasket seals configured as integral inner and outlet seal bands for aiding the hermetically sealing of the valve poppet 26 from the actuator and the external environment or surroundings. This diaphragm pressure balance configuration does not use a small bleed hole to port pressure to the back side of the diaphragm as is commonly done in conventional configurations. This is advantageous because a small bleed hole can be easily plugged by particulates and viscous fluids.

The actuator housing 12 of the proportional valve 10 houses the actuator, denoted generally in the figures by reference numeral 50. As referenced above, in exemplary embodiments the actuator 50 is configured as a linear voice coil motor. The unique linear voice coil motor provides high actuation force across a relatively large stroke with minimizing the power required. This is accomplished by creating a flux frame with a narrow magnetic gap in which two narrow rare earth magnets are positioned inside a non-magnetic carrier suspended by first and second steel spring beams. In this context, the target gap to be considered a narrow gap is approximately 0.005 inches within a minor manufacturing tolerance. The magnet elements are positioned with their poles opposite each other such that when the coils are energized, one magnet element is pulled toward the centerline of the flux frame while the other magnet element is repelled from the centerline of the flux frame. The two steel spring beams restrain the motion of the non-magnetic carrier that houses the magnet elements to an arc with a large enough radius such that the motion is quasi-linear. For such motion to be quasi-linear, a length of the spring beams is substantially large as compared to the valve stroke, and generally is many times larger, such that movement of the non-magnetic carrier holding the magnets is essentially linear over the stroke distance. This makes the actuator silent since there are no contacting parts, which is a desirable for users particularly of breathing apparatuses that often are used in public.

Referring to the figures, the actuator 50 includes, housed within the actuator housing 12, a first magnet element 52 and a second magnet element 54 (see FIG. 3 in particular), that are mounted within a non-magnetic carrier 56. In exemplary embodiments, the first and second magnet elements are rare earth magnets. The magnet elements may be positioned adjacent to a plurality of wire coils, including a first wire coil 58 adjacent to the magnet elements 52 and 54, and a second wire coil 60 adjacent to the magnet elements 52 and 54 on an opposite side of the magnet elements relative to the first wire coil. When electric current is supplied to the wire coils, a magnetic field is generated which operates on the magnet elements to move the valve operator to open the valve. In particular, magnetic field lines are conducted through a flux frame 62 that conducts magnetic field lines through the actuator, and through the non-magnetic carrier 56 to the magnet elements 52 and 54.

Referring to the cross-sectional view of FIG. 3 in particular, in the orientation of the figure the actuator 50 moves up and down to interact against the valve operator 24 at the rounded head 40, which in turn moves the poppet 26 to control the flow through the valve. Accordingly, when the wire coils are energized, the magnetic field that is created causes the non-magnetic carrier to move against the valve operator to move the valve poppet away from the closed position against the valve seat, thereby opening the valve. In the example of the figures, the non-magnetic carrier 56 interacts against the rounded head 40 of the first poppet guide 30 to move the valve poppet from the closed position.

With such configuration, the flux frame 62 forms a minimally narrow magnetic gap 64, the narrow magnetic gap 64 being particularly narrow as compared to conventional configurations. In exemplary embodiments, the rare earth magnet elements are positioned inside the non-magnetic carrier with the poles of the magnet elements facing opposite directions, which operates to double the net actuation force. With such configuration, therefore, when the wire coils are energized to generate the magnetic field through the narrow magnetic gap 64, one magnet element is pulled in towards a centerline of the flux frame while the other magnet element is repelled from the centerline of the flux frame to generate the doubled actuation force. In addition, the non-magnetic carrier 56 may have an I-beam shaped cross-section to narrow the magnetic gap for the conduction of the magnetic field lines.

To better control the actuator response to the magnetic field, the non-magnetic carrier 56 is suspended by a first spring beam 66 adjacent to the first magnet element 52, and the non-magnetic carrier 56 further is suspended by a second spring beam 68 adjacent to the second magnet element 54 (see FIG. 3 in particular). In exemplary embodiments, the first and second spring beams are made of steel. As referenced above, the first and second steel spring beams restrain the motion of the non-magnetic frame that houses the magnet elements to an arc with a large enough or sufficient radius such that the motion of the actuator is quasi-linear over the stroke distance. This again makes the actuator silent since there are no contacting parts, which is a desirable for users particularly of breathing apparatuses that are used in close proximity to patient.

The spring beams 66 and 68 each may be anchored at one end by an end clamp structure attached to the actuator housing opposite from an end to which spring beams are connected to the non-magnetic carrier, with the spring beams being on opposite sides of the flux frame 62. For example, the end clamp structure may include opposing end plates 70 and 72 that are fixed against a base 74 that extends on opposite sides of the flux frame 62, with the spring beams being anchored between respective end plates and the base. The end plates and base may include fastener holes for receiving fastening elements (e.g., bolts, screws, pins, adhesive, or the like) to secure the end plates tightly to the base for tightly anchoring the spring beams between the end plates and the base. As shown in the isometric view of FIG. 1, the spring beams may form a generally triangular shape, although other suitable shapes may be employed, such as having a rectangular or squared off plate shape or configuration. The described embodiments have advantages over conventional configurations. The unique linear moving voice coil motor having a minimally narrow magnetic gap provides a high actuation force across a relatively large stroke, with minimizing the power required as compared to conventional configurations.

As referenced above, the proportional valve 10 is constructed such that pressure forces on the inlet or outlet port are balanced by the dual diagraph pressure balance mechanism including the inlet and outlet diaphragms 42 and 44. Such configuration permits a calibration procedure that can improve valve-to-valve performance consistency. It is known that the valve components, such as in the housing and valve body components, valve poppet, actuator components, and the like, have manufacturing tolerances for which it would be beneficial to account. In addition, it would be beneficial to optimize the valve configuration to account for variations in customer flow and power requirements. Accordingly, embodiments of the present disclosure permit a calibration procedure to account for manufacturing tolerances of the valve components and performance variations.

Accordingly, another aspect of the invention is a method of calibrating a proportional valve comprising the steps of: providing an actuator and a valve assembly including a valve operator and valve body according to any of the embodiments; setting the actuator housing relative to the valve body to position the actuator housing relative to the valve body with a preload on the spring beams to achieve desired flow and leak performance; and positioning components of the actuator within the actuator housing in a manner the maintains the preload at which the desired flow and leak performance are achieved. Setting the actuator housing may include pressing the actuator housing against the valve operator to position the actuator housing. With such operations, the first and second spring beams are pre-loaded to optimize positioning of the first and second magnet elements for the desired flow and lead performance.

Referring to the figures, in a calibration procedure, the spring forces generated by the spring beams 66 and 68 of the actuator are adjusted and preset to attain a suitable preload on the poppet to account for the tolerances of the valve components and/or for customer flow and power requirements. In a simple calibration procedure during assembly, the actuator housing with the magnet elements in the non-magnetic carrier may be pressed into position with a suitable gap or spacing between the actuator housing 12 and the valve body 14 for proper flow and leak performance. Once the gap or spacing is set the flux frame and spring beam anchor structures can be positioned and the overall structure tightened resulting in a secured finished valve. Appropriate spacer elements, such as elements 76 and 78, may be incorporated into the housing structures, such as for example in the actuator housing 12, to maintain the appropriate positioning of the components in place and to ensure a sealed structure. In this manner, the non-magnetic carrier 56 is pre-loaded by the spring beams 66 and 68 to optimize the positioning of the magnet elements for enhanced valve performance by optimizing the valve performance and to achieve valve-to-valve performance consistency. The ability to calibrate the proportional valve 10 during assembly by such operation further enhances the advantage of providing a high actuation force across a relatively large stroke with minimizing the power required as compared to conventional configurations.

An aspect of the invention, therefore, is a proportional valve having a narrow magnetic gap to improve actuator performance, and pressure balancing diaphragms that reduce the required actuation forces. In exemplary embodiments, the proportional valve includes a valve assembly including a valve body that houses a valve operator; the valve body defining an inlet and an outlet for a fluid flow through the valve body; the valve operator having a longitudinal axis and including a poppet that is moveable along the longitudinal axis between a closed position and an open position, wherein in the closed position the poppet seals against a valve seat of the valve body to prevent fluid flow between the inlet and the outlet, and in the open position the poppet is moved away from the valve seat to permit fluid flow between the inlet and the outlet; and an actuator. The actuator comprises an actuator housing that houses: a first magnet element and a second magnet element; a non-magnetic carrier in which the first magnet element and the second magnet element are mounted; a first wire coil located adjacent to the magnet elements and a second wire coil located adjacent to the magnet elements on an opposite side of the magnet elements relative to the first wire coil; a first spring beam to which the non-magnetic carrier is suspended adjacent to the first magnet element, and a second spring beam to which the non-magnetic carrier is suspended adjacent to the second magnet element; and a flux frame that conducts magnetic field lines through the actuator. When the wire coils are energized, a magnetic field is generated which causes the non-magnetic carrier to move against the valve operator to move the valve poppet away from the closed position against the valve seat, thereby opening the valve; and the first and second spring beams restrain the movement of the non-magnetic carrier to an arc of sufficient radius that said movement is quasi-linear. The proportional valve may include one or more of the following features, either individually or in combination.

In an exemplary embodiment of the proportional valve, the first and second magnet elements are positioned with their poles opposite each other such that when the wire coils are energized, one magnet element is pulled toward a centerline of the flux frame while the other magnet element is repelled from the centerline of the flux frame.

In an exemplary embodiment of the proportional valve, the non-magnetic carrier has an I-beam shaped cross-section to narrow the magnetic gap for the conduction of the magnetic field.

In an exemplary embodiment of the proportional valve, the first magnet element and the second magnet element are rare earth magnets.

In an exemplary embodiment of the proportional valve, the first spring beam and the second spring beam are made of steel.

In an exemplary embodiment of the proportional valve, the first and second spring beams are anchored at one end by an end clamp structure attached to the actuator housing opposite from an end to which spring beams are connected to the non-magnetic carrier, with the spring beams being on opposite sides of the flux frame.

In an exemplary embodiment of the proportional valve, the valve operator further comprises an inlet diaphragm adjacent to the inlet and an outlet diaphragm adjacent to the outlet that pressure balance flow pressures at the inlet and the outlet.

In an exemplary embodiment of the proportional valve, the valve operator further includes a first poppet guide at a first end of the valve poppet, and a second poppet guide at a second end of the valve poppet, which guide movement of the poppet between the closed position and the open position.

In an exemplary embodiment of the proportional valve, the first poppet guide includes a rounded head against which the non-magnetic carrier interacts to move the valve poppet.

In an exemplary embodiment of the proportional valve, the poppet includes a sealing element that seals against the valve seat when the poppet is in the closed position.

In an exemplary embodiment of the proportional valve, the sealing element in an O-ring seal.

In an exemplary embodiment of the proportional valve, the proportional valve further includes an inlet seal that seals the inlet and an outlet seal that seals the outlet.

In an exemplary embodiment of the proportional valve, the inlet seal and the outlet seal are O-ring seals.

In an exemplary embodiment of the proportional valve, the valve poppet is hermetically sealed from the actuator and from external surroundings.

In an exemplary embodiment of the proportional valve, the valve operator further includes a valve spring that biases the poppet in the closed position.

Another aspect of the invention is a method of calibrating a proportional valve to achieve a high valve-to-valve performance consistency. In exemplary embodiments, the method includes the steps of: providing an actuator according to any of the embodiments; providing a valve assembly according to any of the embodiments; setting the actuator housing relative to the valve body to position the actuator housing relative to the valve body with a preload on the spring beams to achieve desired flow and leak performance; and positioning components of the actuator within the actuator housing in a manner the maintains the preload at which the desired flow and leak performance are achieved. The method may include one or more of the following features, either individually or in combination.

In an exemplary embodiment of the method of calibrating a proportional valve, setting the actuator housing comprises pressing the actuator housing against the valve operator to position the actuator housing.

In an exemplary embodiment of the method of calibrating a proportional valve, the first and second spring beams are pre-loaded to optimize positioning of the first and second magnet elements for valve-to-valve performance consistency.

In an exemplary embodiment of the method of calibrating a proportional valve, the method further includes incorporating spring pins into the proportional valve and pressing the actuator to the valve body with the spring pins to maintain the preload to form a completed proportional valve assembly, and tightening components of the completed proportional valve assembly in place.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A proportional valve comprising:
a valve assembly including a valve body that houses a valve operator;
the valve body defining an inlet and an outlet for a fluid flow through the valve body;
the valve operator having a longitudinal axis and including a poppet that is moveable along the longitudinal axis between a closed position and an open position, wherein in the closed position the poppet seals against a valve seat of the valve body to prevent fluid flow between the inlet and the outlet, and in the open position the poppet is moved away from the valve seat to permit fluid flow between the inlet and the outlet; and
an actuator, wherein the actuator comprises an actuator housing that houses:
a first magnet element and a second magnet element;
a non-magnetic carrier in which the first magnet element and the second magnet element are mounted;

a first wire coil located adjacent to the first and second magnet elements, and a second wire coil located adjacent to the first and second magnet elements on an opposite side of the magnet elements relative to the first wire coil;

a first spring beam to which the non-magnetic carrier is suspended, the first spring beam being positioned adjacent to the first magnet element, and a second spring beam to which the non-magnetic carrier is suspended, the second spring beam being positioned adjacent to the second magnet element; and a flux frame that conducts magnetic field lines through the actuator;

wherein when the wire coils are energized, a magnetic field is generated which causes the non-magnetic carrier to move against the valve operator to move the poppet away from the closed position against the valve seat, thereby opening the valve; and wherein the first and second spring beams are connected to the non-magnetic carrier to control the actuator response to the magnetic field by restraining the movement of the non-magnetic carrier to an arc of sufficient radius that said movement is quasi-linear.

2. The proportional valve of claim 1, wherein the first and second magnet elements are positioned with their poles opposite each other such that when the wire coils are energized, one magnet element is pulled toward a centerline of the flux frame while the other magnet element is repelled from the centerline of the flux frame.

3. The proportional valve of claim 1, wherein the non-magnetic carrier has an I-beam shaped cross-section to narrow the magnetic gap for the conduction of the magnetic field.

4. The proportional valve of claim 1, wherein the first magnet element and the second magnet element are rare earth magnets.

5. The proportional valve of claim 1, wherein the first spring beam and the second spring beam are made of steel.

6. The proportional valve of claim 1, wherein the first and second spring beams are directly anchored at one end by an end clamp structure attached to the actuator housing opposite from an end to which spring beams are connected to the non-magnetic carrier, with the spring beams being on opposite sides of the flux frame.

7. The proportional valve of claim 1, wherein the valve operator further comprises an inlet diaphragm adjacent to the inlet and an outlet diaphragm adjacent to the outlet that pressure balance flow pressures at the inlet and the outlet.

8. The proportional valve of claim 1, wherein the valve operator further includes a first poppet guide at a first end of the valve poppet, and a second poppet guide at a second end of the valve poppet, which guide movement of the poppet between the closed position and the open position.

9. The proportional valve of claim 8, wherein the first poppet guide includes a rounded head against which the non-magnetic carrier interacts to move the valve poppet.

10. The proportional valve of claim 1, wherein the poppet includes a sealing element that seals against the valve seat when the poppet is in the closed position.

11. The proportional valve of claim 10, wherein the sealing element is an O-ring seal.

12. The proportional valve of claim 1, further comprising an inlet seal that seals the inlet and an outlet seal that seals the outlet.

13. The proportional valve of claim 12, wherein the inlet seal and the outlet seal are O-ring seals.

14. The proportional valve of claim 1, wherein the valve poppet is hermetically sealed from the actuator and from external surroundings.

15. The proportional valve of claim 1, wherein the valve operator further includes a valve spring that biases the poppet in the closed position.

16. The proportional valve of claim 1, wherein the spring beams form a triangular shape.

17. A method of calibrating a proportional valve comprising the steps of:

providing an actuator, wherein the actuator comprises an actuator housing that houses: a first magnet element and a second magnet element; a non-magnetic carrier in which the first magnet element and the second magnet element are mounted; a first wire coil located adjacent to the magnet elements and a second wire coil located adjacent to the second magnet elements on an opposite side of the magnet elements relative to the first wire coil; a first spring beam to which the non-magnetic carrier is suspended, the first spring beam being positioned adjacent to the first magnet element, and a second spring beam to which the non-magnetic carrier is suspended, the second spring beam being positioned adjacent to the second magnet element; and a flux frame that conducts magnetic field lines through the actuator;

providing a valve assembly comprising a valve body defining an inlet and an outlet for a fluid flow through the valve body and a valve operator having a longitudinal axis and including a poppet that is moveable along the longitudinal axis between a closed position and an open position, wherein in the closed position the poppet seals against a valve seat of the valve body to prevent fluid flow between the inlet and the outlet, and in the open position the poppet is moved away from the valve seat to permit fluid flow between the inlet and the outlet; the valve operator further comprises an inlet diaphragm adjacent to the inlet and an outlet diaphragm adjacent to the outlet;

setting the actuator housing relative to the valve body to position the actuator housing relative to the valve body with a preload on the spring beams to achieve desired flow and leak performance, the first and second spring beams being connected to the non-magnetic carrier to control the actuator response to the magnetic field by restraining the movement of the non-magnetic carrier to an arc of sufficient radius that said movement is quasi-linear; and positioning components of the actuator within the actuator housing in a manner that maintains the preload at which the desired flow and leak performance are achieved.

18. The method of calibrating a proportional valve of claim 17, wherein setting the actuator housing comprises pressing the actuator housing against the valve operator to position the actuator housing.

19. The method of calibrating a proportional valve of claim 17, wherein the first and second spring beams are pre-loaded to optimize positioning of the first and second magnet elements for valve-to-valve performance consistency.

* * * * *